United States Patent
Stayton et al.

(10) Patent No.: US 11,467,249 B2
(45) Date of Patent: Oct. 11, 2022

(54) INTERVAL MANAGEMENT USING DATA OVERLAY

(71) Applicant: Aviation Communication & Surveillance Systems LLC, Phoenix, AZ (US)

(72) Inventors: Gregory T. Stayton, Peoria, AZ (US); Charles Manberg, Phoenix, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 217 days.

(21) Appl. No.: 14/331,089

(22) Filed: Jul. 14, 2014

(65) Prior Publication Data

US 2014/0320332 A1    Oct. 30, 2014

Related U.S. Application Data

(63) Continuation-in-part of application No. 12/105,248, filed on Apr. 17, 2008, now Pat. No. 9,791,562.
(Continued)

(51) Int. Cl.
*G08G 5/00* (2006.01)
*G01S 13/933* (2020.01)
(Continued)

(52) U.S. Cl.
CPC ............ *G01S 7/003* (2013.01); *G01S 13/765* (2013.01); *G01S 13/784* (2013.01);
(Continued)

(58) Field of Classification Search
CPC ...... G01S 7/003; G01S 13/765; G01S 13/784; G01S 13/933–935; G01S 13/91–913;
(Continued)

(56) References Cited

U.S. PATENT DOCUMENTS 5,636,123 A    6/1997    Rich et al.
5,691,723 A    11/1997   King et al.
(Continued)

OTHER PUBLICATIONS

Penhallegon et al. "Flight Deck-Based Interval Management-Spacing During Departures: Flight Crew Human-In-The-Loop Simulation." Ninth USA/Europe Air Traffic Management Research and Development Seminar. Jun. 14-17, 2011. 12 Pages. <http://www.atmseminar.org/seminarContent/seminar9/papers/120-Penhallegon-Final-Paper-4-15-11.pdf> Accessed Nov. 21, 2016.*
(Continued)

*Primary Examiner* — Matthew M Barker
(74) *Attorney, Agent, or Firm* — Dickinson Wright PLLC

(57) ABSTRACT

Computer assistance in interval management may be beneficial in a number of ways. For example, digital communication of interval management instructions or information related to interval management may beneficially be communicated to aircraft with respect to other aircraft. This information may be communicated overlaid on air traffic control (ATC) communications, or otherwise. A method can include, for example, obtaining a spacing goal for an aircraft relative to a target aircraft. The method can also include determining clearance instructions for the aircraft, wherein the speed guidance is based on the spacing goal. The method can further include transmitting the clearance instructions in a computer-readable format to the aircraft. The instructions can be provided by an overlay-modulated signal of a provided modulated ATC signal. The instructions can be configured to enable control of the aircraft to achieve the spacing goal.

17 Claims, 5 Drawing Sheets

Related U.S. Application Data

(60) Provisional application No. 61/845,864, filed on Jul. 12, 2013, provisional application No. 60/926,126, filed on Apr. 24, 2007.

(51) Int. Cl.

| | | |
|---|---|---|
| *G01S 7/00* | (2006.01) | |
| *H04L 27/18* | (2006.01) | |
| *G01S 13/76* | (2006.01) | |
| *H04L 25/49* | (2006.01) | |
| *H04L 27/02* | (2006.01) | |
| *G01S 13/78* | (2006.01) | |

(52) U.S. Cl.
CPC .......... *G01S 13/933* (2020.01); *G08G 5/0008* (2013.01); *G08G 5/0013* (2013.01); *G08G 5/0021* (2013.01); *G08G 5/0026* (2013.01); *G08G 5/0052* (2013.01); *G08G 5/0078* (2013.01); *G08G 5/0082* (2013.01); *H04L 25/4902* (2013.01); *H04L 27/02* (2013.01); *H04L 27/18* (2013.01)

(58) Field of Classification Search
CPC ............ G01S 2013/916; G08G 5/0008; G08G 5/0078; G08G 5/0052; G08G 5/0026; G08G 5/0021; G08G 5/0013; G08G 5/0082; H04L 27/18; H04L 27/02; H04L 25/4902

See application file for complete search history.

(56) References Cited

U.S. PATENT DOCUMENTS

| | | | |
|---|---|---|---|
| 6,584,384 B2 | 6/2003 | Gremmert et al. | |
| 6,603,819 B1 | 8/2003 | Myers | |
| 6,748,030 B2 | 6/2004 | Myers | |
| 7,215,713 B2 | 5/2007 | Walker | |
| 7,308,046 B1 | 12/2007 | Studenberg | |
| 7,373,223 B2 | 5/2008 | Murphy | |
| 7,414,567 B2 | 8/2008 | Zhang et al. | |
| 7,633,428 B1 | 12/2009 | McCusker et al. | |
| 8,629,787 B1 * | 1/2014 | Rathinam | G08G 5/0013 340/963 |
| 9,142,133 B2 * | 9/2015 | Palanisamy | G08G 5/0021 |
| 9,355,564 B1 * | 5/2016 | Tyson | G08G 5/0008 |
| 2008/0032644 A1 | 2/2008 | Hunter | |
| 2008/0103647 A1 | 5/2008 | Fabrice et al. | |
| 2010/0079329 A1 | 4/2010 | Stayton | |
| 2010/0311354 A1 * | 12/2010 | Stayton | H04L 5/02 455/90.1 |
| 2010/0332056 A1 * | 12/2010 | Kirk | G01W 1/04 701/14 |
| 2011/0282582 A1 * | 11/2011 | Stayton | G08G 5/0078 701/301 |
| 2012/0245835 A1 * | 9/2012 | Weitz | G08G 5/0043 701/120 |
| 2013/0231852 A1 * | 9/2013 | Weitz | G08G 5/0013 701/120 |
| 2013/0338909 A1 * | 12/2013 | de Blanes | G06Q 10/047 701/120 |
| 2014/0249701 A1 * | 9/2014 | Latsu-Dake | G08G 5/0021 701/14 |

OTHER PUBLICATIONS

NAVCANADA. "Guidance Material for ATS Data Link Services in NAT Airspace" Chapter 2—CPDLC. v10.0. pp. I-67. May 20, 2004 (Year: 2004).*
Levitt et al. "Towards Defining Required Interval Management Performance" Ninth USA/Europe Air Traffic Management Research and Development Seminar. 10 pages. (Year: 2011).*
Barmore et al. "A Concept for Airborne Precision Spacing for Dependent Parallel Approaches". National Aeronautics and Space Administration. Mar. 2012. (Year: 2012).*
Bone et al. "Evaluation of Pilot and Air Traffic Controller Use of Third Party Call Sign in Voice Communications with Pilot Utilization of Cockpit Display of Traffic". The MITRE Corporation. Jul. 2013. (Year: 2013).*
International Search Report, issued by the International Searching Authority dated Nov. 20, 2014 for related PCT Application No. PCT/US2014/046563.
Federal Aviation Administration, "Advanced Interval Management (Focus: RTCA Special Committee 214 Tasking) Preliminary Concept of Operations," Mar. 27, 2014.

\* cited by examiner

INTERVAL MANAGEMENT USING DATA OVERLAY

CROSS REFERENCE TO RELATED APPLICATIONS

This application is related to and claims the benefit and priority of U.S. Provisional Patent Application No. 61/845,864, filed Jul. 12, 2013, the entirety of which is hereby incorporated herein by reference. This application is also a continuation-in-part of, and claims the benefit and priority of, U.S. patent application Ser. No. 12/105,248, filed Apr. 17, 2008, the entirety of which is hereby incorporated herein by reference, which claims the priority of U.S. Provisional Application No. 60/926,126, filed Apr. 24, 2007, the entirety of which is also hereby incorporated herein by reference.

BACKGROUND

Field

Computer assistance in interval management may be beneficial in a number of ways. For example, digital communication of interval management instructions or information related to interval management may beneficially be communicated to aircraft with respect to other aircraft. This information may be communicated overlaid on air traffic control (ATC) communications, or otherwise.

Description of the Related Art

Airborne applications can benefit from a data link. In particular, airborne applications that are complex and utilize large amounts of data may benefit from data links. However, bandwidth for such applications is currently limited. Global coordination for a common data link is becoming a challenge.

Additionally, the use of existing data links for such applications are expensive. Such use is costly on a per bit basis, as well as on a per service basis. A new unit on aircraft is conventionally required for such use.

SUMMARY

According to certain embodiments, a method can provide interval management by encoding an overlay message onto a provided modulated air traffic control (ATC) signal. The method can include employing a selected overlay modulation protocol. The method can also include modulating the provided modulated ATC signal with the overlay message using the selected overlay modulation protocol. The provided modulated ATC signal can be modulated with a pulse position modulation protocol. The overlay message can be configured to provide interval management with respect to a flight path of a target aircraft. The ATC signal can be independently demodulatable from the overlay message. The ATC signal modulated with the overlay message can be recognizable as an ATC signal by legacy ATC equipment.

In certain embodiments, a method can create a data link for interval management. The method can include encoding a first data stream into an avionics signal using a first modulation protocol to create a modulated avionics signal. The method can also include modulating the modulated avionics signal with a second data stream using a second modulation protocol to create an overlay-modulated signal. The second data stream can be configured to provide interval management with respect to a flight path of a target aircraft. The method can also include transmitting the overlay-modulated signal through a transponder. The method can further include receiving the overlay-modulated signal in a receiver. The method can additionally include extracting the second data stream from the overlay-modulated signal by using a second demodulation protocol. The method can also include extracting the first data stream from the overlay-modulated signal by using a first demodulation protocol.

A method, in certain embodiments, can create a data link for interval management. The method can include encoding a first data stream into an avionics signal using a first modulation protocol to create a modulated avionics signal. The method can also include modulating the modulated avionics signal with a second data stream using a second modulation protocol to create an overlay-modulated signal, wherein the second data stream is configured to provide interval management with respect to a flight path of a target aircraft. The method can further include transmitting the overlay-modulated signal through a transponder to enable control an aircraft with respect to the target aircraft.

A method of interval management, according to certain embodiments, can include obtaining a spacing goal for an aircraft relative to a target aircraft. The method can also include determining clearance instructions for the aircraft, wherein the speed guidance is based on the spacing goal. The method can further include transmitting the clearance instructions in a computer-readable format to the aircraft, wherein the instructions are provided by an overlay-modulated signal of a provided modulated air traffic control (ATC) signal, and wherein the instructions are configured to enable control of the aircraft to achieve the spacing goal.

BRIEF DESCRIPTION OF THE DRAWINGS

For proper understanding of the invention, reference should be made to the accompanying drawings, wherein.

DETAILED DESCRIPTION

Using an existing frequency and existing equipment can provide a global data link for airborne applications. Embodiments consistent with the certain embodiments of the present invention may use existing 1090 MHz airborne surveillance systems. Moreover, such embodiments may use existing ADS-B ground stations and infrastructure including, without limitation, System Wide Information Management (SWIM).

1090 MHz phase enhancement technology, which can also be referred to as data overlay, can be readily used to provide additional bandwidth to support airborne application needs. Embodiments of certain embodiments of the present invention may be used to, among other things, provide: interval management target aircraft flight path information; runway contaminants downlink and uplink for Runway Overrun Prevention System (ROPS); airport traffic flow management; and FAA Block 2 data communication for trajectory-based operations. Certain embodiments can be used in other contexts as well, such as with respect to wake vortices.

Figure 1:
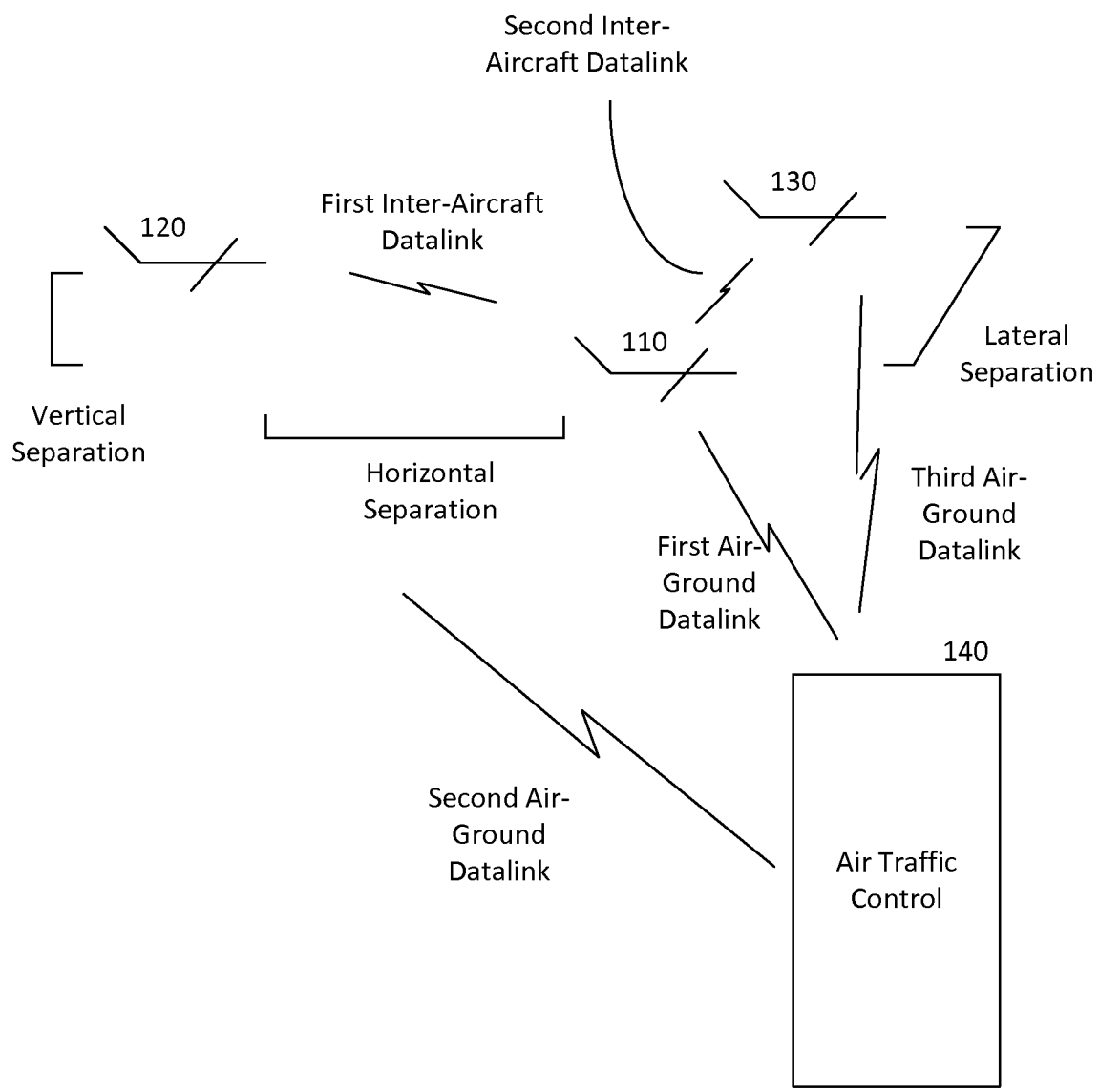
FIG. 1 illustrates a system according to certain embodiments.

FIG. 1 illustrates a system according to certain embodiments. As shown in FIG. 1, the system can include a first aircraft 110, a second aircraft 120, and a third aircraft 130. Although these aircraft are illustrated as fixed wing aircraft, any kind of aircraft can be used including aerostats and aerodynes, fixed-wing and rotorcraft, powered and unpowered, jet propulsion, and propeller driven aircraft. Other kinds of aircraft are also permitted. The system can also include at least one air traffic control 140. Air traffic control 140 can be a tower at an airport, aircraft carrier, landing strip, or the like. Alternatively or in addition air traffic control 140 can include regional or national air traffic control facilities and equipment. Air traffic control 140 can be implemented as a network of ground-based facilities that communicate with one another using microwave links, fiber-optic networks, or other communication channels.

Each of the aircraft and air traffic control 140 can be equipped with a computer and with communication hardware. The computer and communication hardware can include avionics hardware and can be specially adapted and/or structurally configured to perform methods and functions associated with certain embodiments of the present invention.

As shown in FIG. 1, air traffic control 140 can be connected to first aircraft 110 by a first air-ground datalink. Likewise, air traffic control 140 can be connected to second aircraft 120 by a second air-ground datalink and to a third aircraft 130 by a third air-ground datalink. Additionally, the first aircraft 110 can be connected to the second aircraft 120 by a first inter-aircraft datalink and to a third aircraft 130 by a second inter-aircraft datalink. Although the links are shown as point-to-point links, the communications can be broadcast or relayed. A direct link between the second aircraft 120 and the third aircraft 130 is not shown but may be present. Other aircraft and other air traffic control stations can also be present and may each have their own datalinks. The datalinks may, for example, by provided by data overlaid on an air traffic control (ATC) signal.

In FIG. 1, three forms of separation are shown amongst the aircraft. There can be a vertical separation, namely the difference in altitude between two aircraft. There can also be a horizontal separation, namely a spacing in-trail between two aircraft. There can also be a lateral separation, namely a spacing along a parallel path. Although these three separations are identified, corresponding to separations in the x, y, and z dimensions for the first aircraft 110, separation can be a combination of these. Furthermore, it should be understood that separation may also apply to planes that are not aligned or parallel with one another.

Figure 2:
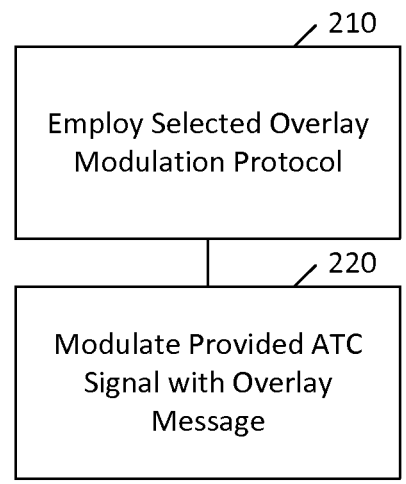
FIG. 2 illustrates a method according to certain embodiments.

FIG. 2 illustrates a method according to certain embodiments. The method may be a method of providing interval management by encoding an overlay message onto a provided modulated air traffic control (ATC) signal.

As shown in FIG. 2, a method can include, at 210, employing a selected overlay modulation protocol. The method can also more particularly include, at 220, modulating a provided modulated ATC signal with the overlay message using the selected overlay modulation protocol. The provided modulated ATC signal can be modulated with a pulse position modulation protocol. The overlay message can be configured to provide interval management with respect to a flight path of a target aircraft. Furthermore, the ATC signal can be independently demodulatable from the overlay message. Also, the ATC signal modulated with the overlay message can be recognizable as an ATC signal by legacy ATC equipment. Legacy ATC equipment here can refer to ATC equipment that is not equipped to demodulate the overlay modulation.

Figure 3:
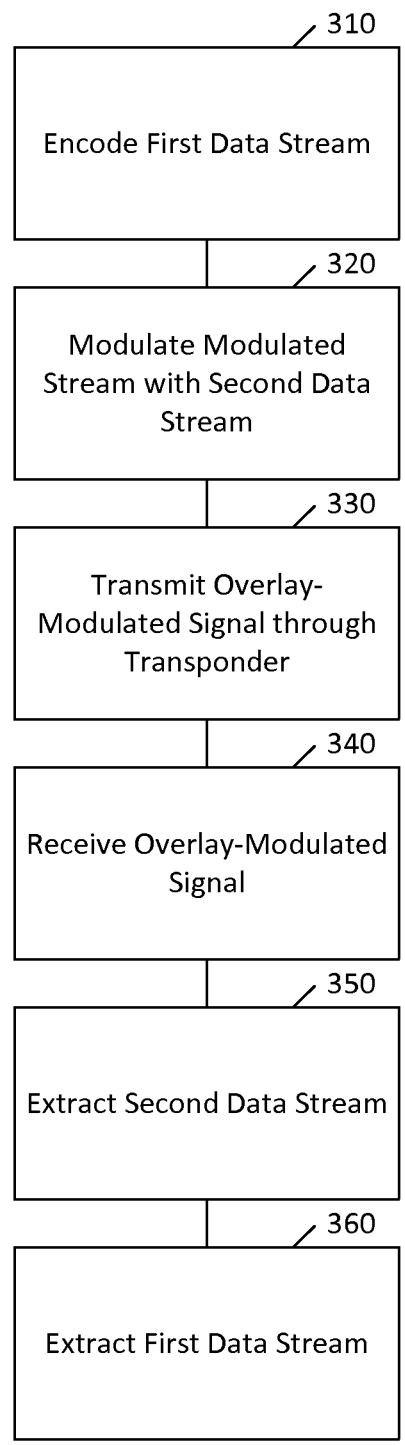
FIG. 3 illustrates another method according to certain embodiments.

FIG. 3 illustrates another method according to certain embodiments. The method may be a method for creating a data link for interval management. As shown in FIG. 3, the method can include, at 310, encoding a first data stream into an avionics signal using a first modulation protocol to create a modulated avionics signal. The method can also include, at 320, modulating the modulated avionics signal with a second data stream using a second modulation protocol to create an overlay-modulated signal. The second data stream can be configured to provide interval management with respect to a flight path of a target aircraft. The method can further include, at 330, transmitting the overlay-modulated signal through a transponder.

Additionally, the method can include, at 340, receiving the overlay-modulated signal in a receiver. Furthermore, the method can include, at 350, extracting the second data stream from the overlay-modulated signal by using a second demodulation protocol. Furthermore, the method can include, at 360, extracting the first data stream from the overlay-modulated signal by using a first demodulation protocol.

Figure 4:
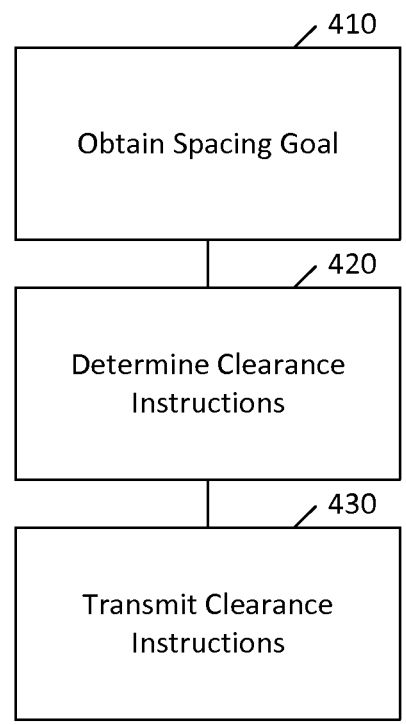
FIG. 4 illustrates a further method according to certain embodiments.

FIG. 4 illustrates a further method according to certain embodiments. The method can be a method of interval management. The method can include, at 410, obtaining a spacing goal for an aircraft relative to a target aircraft. The method can also include, at 420, determining clearance instructions for the aircraft, wherein the speed guidance is based on the spacing goal. The method can further include, at 430, transmitting the clearance instructions in a computer-readable format to the aircraft. The instructions can be provided by an overlay-modulated signal of a provided modulated air traffic control (ATC) signal. The instructions can be configured to enable control of the aircraft to achieve the spacing goal.

The control of the aircraft can be performed automatically by a computer or manually by a pilot of the aircraft. For example, if the aircraft is an unmanned aerial vehicle (UAV), the instructions may be implemented automatically by the UAV.

The clearance instructions can include any one or more than of the following: target aircraft ID, assigned spacing goal, starting event, achieve—by point, planned termination point, intercept point, target aircraft intended flight path information, and IM clearance type. Additionally, received information can provided directly or indirectly from a target aircraft and can include target aircraft estimated time of arrival ETA to the achieve-by point and/or the intended flight path information. Thus, in certain embodiments such information can be provided directly from the target aircraft as opposed to this information being included in the clearance from the ATC. The clearance instructions can be of various types, such as achieve-by then maintain, maintain current spacing, and turn.

The clearance instructions can be configured to support operation on parallel runways. Furthermore, the clearance instructions can relate to a plurality of target aircraft. For two target operations the method could include sending and receiving a second target identification (ID), second target intended flight path information and a two target spacing type. Also, similar to the single target aircraft, the target aircraft could provide an estimated time of arrival (ETA) to the achieve-by point and/or its intended flight path information.

Figure 5:
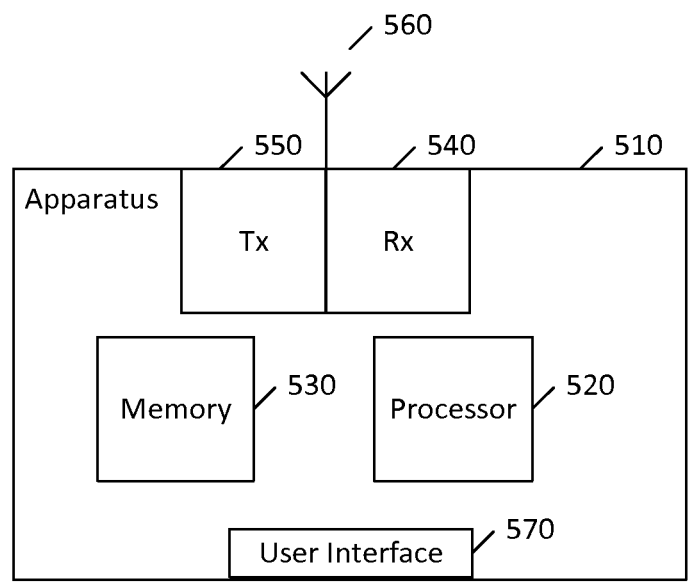
FIG. 5 illustrates an apparatus according to certain embodiments.

FIG. 5 illustrates an apparatus according to certain embodiments. The apparatus 510 of FIG. 5 may be implemented in an aircraft or an ATC facility, such as a ground station, or any of the devices shown or described herein, such as those shown in FIG. 1. The apparatus 510 shown in FIG. 5 may be configured to perform the methods shown or described herein, such as those shown in FIGS. 2 through 4. More than one apparatus 510 can be employed in a particular system, and at least one apparatus 510 can be included in each aircraft or ATC.

The apparatus 510 can include at least one processor 520 and at least one memory 530 including computer program instructions. The processor 520 can be one or more central processing unit (CPU) or application specific integrated circuit (ASIC) or field programmable gate array (FPGA). The processor 520 can be part of an avionics system. The memory 530 can be a random access memory (RAM) or a sequential access memory and can be configured to store instructions and/or to serve as a buffer. The memory 530 and processor 520 can be provided on a single chip or separately. The computer program instructions can any suitable computer instructions such as a compiled program or a program written in an interpreted language.

The apparatus 510 can also include a transceiver or transponder including a receiver (Rx) 540 and a transmitter (Tx) 550. The transceiver or transponder can be included with the apparatus 510 or optionally can be separate from the apparatus 510. The transceiver or transponder can be equipped with one or more antenna 560, which can be configured for ADS-B communication and/or for other communication.

The apparatus 510 can also include a user interface 570. The user interface 570 can be a graphical user interface and can include peripherals, such as a touch screen, keypad, or other input peripherals. The user interface 570 can be included with or apart from the apparatus 510.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of providing interval management by encoding an overlay message onto a provided modulated air traffic control (ATC) signal, the method comprising:
   obtaining a spacing goal for a first aircraft relative to a target aircraft;
   determining clearance instructions for the first aircraft;
   employing a selected overlay modulation protocol;
   modulating the provided modulated ATC signal with the overlay message using the selected overlay modulation protocol, wherein the provided modulated ATC signal is modulated with a pulse position modulation protocol, wherein the overlay message is configured to provide interval management with respect to a flight path of the target aircraft;
   transmitting the clearance instructions in the overlay message through a first air-ground datalink to the first aircraft, wherein the clearance instructions comprise information relating to a plurality of target aircraft further comprising a second target identification, a second target intended flight path, and a two-target spacing type; and
   relaying the overlay message from the first aircraft to at least one of the plurality of target aircraft through at least one inter-aircraft datalink;
   wherein:
   the ATC signal is independently demodulatable from the overlay message;
   the ATC signal modulated with the overlay message is recognizable as an ATC signal by legacy ATC equipment; and
   further comprising receiving from a first target aircraft of the plurality of aircraft an estimated time of arrival (ETA) to an achieve-by point.

2. The method of claim 1, wherein the clearance instructions comprise at least one of target aircraft ID, starting event, achieve-by point, planned termination point, intercept point, target aircraft intended flight path information, and interval management clearance type.

3. The method of claim 1, wherein the clearance instructions are of a type comprising at least one of achieve-by then maintain, maintain current spacing, and turn.

4. The method of claim 1, wherein the clearance instructions are configured to support operation on parallel runways.

5. A method for creating a data link for interval management comprising:
   encoding a first data stream into an avionics signal using a first modulation protocol to create a modulated avionics signal;
   modulating the modulated avionics signal with a second data stream using a second modulation protocol to create an overlay-modulated signal, wherein the second data stream is configured to provide interval management with respect to a flight path of a target aircraft;
   transmitting the overlay-modulated signal through a transponder;
   receiving the overlay-modulated signal in a receiver;
   extracting the second data stream from the overlay-modulated signal by using a second demodulation protocol; and
   extracting the first data stream from the overlay-modulated signal by using a first demodulation protocol;
   obtaining a spacing goal for an aircraft relative to the target aircraft;
   determining clearance instructions for the aircraft, wherein speed guidance is determined based on the spacing goal;
   transmitting the clearance instructions in the second data stream, further comprising information relating to a plurality of target aircraft, the information relating to a plurality of aircraft including a second target identification, a second target intended flight path, and a two-target spacing type, the second data stream relayed through at least one inter-aircraft datalink; and
   further comprising receiving from a first target aircraft of the plurality of aircraft an estimated time of arrival (ETA) to an achieve-by point.

6. The method of claim 5, wherein the clearance instructions comprise at least one of target aircraft ID, starting event, achieve-by point, planned termination point, intercept point, target aircraft intended flight path information, and interval management clearance type.

7. The method of claim 5, wherein the clearance instructions are of a type comprising at least one of achieve-by then maintain, maintain current spacing, and turn.

8. The method of claim 5, wherein the clearance instructions are configured to support operation on parallel runways.

9. A method for creating a data link for interval management comprising:
- encoding a first data stream into an avionics signal using a first modulation protocol to create a modulated avionics signal;
- modulating the modulated avionics signal with a second data stream using a second modulation protocol to create an overlay-modulated signal, wherein the second data stream is configured to provide interval management with respect to a flight path of a target aircraft; and
- transmitting the overlay-modulated signal through a transponder to enable control an aircraft with respect to the target aircraft;
- obtaining a spacing goal for an aircraft relative to the target aircraft;
- determining clearance instructions for the aircraft, wherein speed guidance is determined based on the spacing goal;
- transmitting the clearance instructions in the second data stream, the clearance instructions further comprising information relating to a plurality of target aircraft, the information relating to a plurality of aircraft including a second target identification, a second target intended flight path, and a two-target spacing type, the second data stream relayed through at least one inter-aircraft datalink; and
- further comprising receiving from a first target aircraft of the plurality of aircraft an estimated time of arrival (ETA) to an achieve-by point.

10. The method of claim 9, wherein the clearance instructions comprise at least one of target aircraft ID, starting event, achieve-by point, planned termination point, intercept point, target aircraft intended flight path information, and interval management clearance type.

11. The method of claim 9, wherein the clearance instructions are of a type comprising at least one of achieve-by then maintain, maintain current spacing, and turn.

12. The method of claim 9, wherein the clearance instructions are configured to support operation on parallel runways.

13. A method of interval management, the method comprising:
- obtaining a spacing goal for an aircraft relative to a target aircraft;
- determining clearance instructions for the aircraft, wherein speed guidance is determined based on the spacing goal;
- transmitting the clearance instructions in a computer-readable format to the aircraft, wherein the instructions are provided by an overlay-modulated signal of a provided modulated air traffic control (ATC) signal, and wherein the instructions are configured to enable control of the aircraft to achieve the spacing goal, the clearance instructions further comprising information relating to a plurality of target aircraft, the information relating to a plurality of aircraft including a second target identification, a second target intended flight path, and a two-target spacing type, the overlay-modulated signal relayed through at least one inter-aircraft datalink; and
- further comprising receiving from a first target aircraft of the plurality of aircraft an estimated time of arrival (ETA) to an achieve-by point.

14. The method of claim 13, wherein the control of the aircraft is performed automatically by a computer or manually by a pilot of the aircraft.

15. The method of claim 13, wherein the clearance instructions comprise at least one of target aircraft ID, starting event, achieve-by point, planned termination point, intercept point, target aircraft intended flight path information, and interval management clearance type.

16. The method of claim 13, wherein the clearance instructions are of a type comprising at least one of achieve-by then maintain, maintain current spacing, and turn.

17. The method of claim 13, wherein the clearance instructions are configured to support operation on parallel runways.

* * * * *